INVENTOR
DONALD C. SMALL
BY
ATTORNEYS

INVENTOR
DONALD C. SMALL
BY
*G. D. O'Brien*
*Q. Baxter Warner*
ATTORNEYS

INVENTOR
DONALD C. SMALL
G.O.O'Brien
Q. Baxter Warner
ATTORNEYS

United States Patent Office 2,714,697
Patented Aug. 2, 1955

2,714,697

3-PHASE, RC, VARIABLE VOLTAGE, VARIABLE FREQUENCY OSCILLATOR FOR ELECTRIC MOTOR

Donald C. Small, Hyattsville, Md., assignor to the United States of America as represented by the Secretary of the Navy Application April 2, 1953, Serial No. 346,411

5 Claims. (Cl. 318—231)

This invention relates, in general, to a controlled constant frequency source for operating a radar antenna motor at a fixed speed. More particularly, this invention relates to a 3-phase, R-C, variable voltage, variable frequency oscillator for use as a control arrangement for maintaining a radar antenna motor at constant speed.

The operation of some rocket propelled missiles requires that the antenna nutator motor in the ground radar be operated at a constant speed of 1800 R. P. M. This motor, being of the induction type, will not operate at what is called "synchronous speed" when operating from commercial power or power supplied in field installations. For this reason, a control unit is needed to operate and control the speed of the motor electronically.

It is, therefore, one of the objects of this invention to provide an electronic control arrangement for operating and controlling an antenna nutator motor for a radar unit.

It is another object of this invention to provide a controlled constant frequency source for operating a radar antenna motor at a fixed speed.

Still another object of the invention is to provide a 3-phase oscillator controlled arrangement for an antenna nutator motor that is readily adaptable for use as 2-phase, 3-phase, 4-phase and higher phase operations, if necessary.

A further object of the invention is to provide a nutator speed controller which can be utilized to control the speed of a radar antenna motor at thirty (30) cycles plus or minus one percent (1%), and one in which a pair of nutators run in phase with each other.

And another object of the invention is to adapt a single phase voltage controlled oscillator in a "ring" circuit to obtain multi-phase output.

Other objects and many of the attendant advantages of this invention will be more fully appreciated as the same becomes better understood by reference to the following detailed description when considered in connection with the following drawings, and in which.

In accordance with the invention, a 3-phase, R-C, variable voltage, variable frequency oscillator arrangement is provided for use as a control arrangement with aerial missiles of the rocket type. This arrangement comprises a frequency discriminator, a 3-phase voltage controlled oscillator, a plurality of power amplifiers, and power supplies for the arrangement. The basic circuit used is of a single phase voltage controlled oscillator type. By using an appropriate number of electronic tubes, depending on the number of phases output desired in a "ring" circuit, a multi-phase oscillator arrangement is obtained which is very stable, easily frequency controlled, and one in which the angle between phases is exact. The oscillator arrangement can be adapted to low, medium, or high power application.

The nutator speed controller to be described subsequently is a servo controlled speed regulating device for a 3-phase induction motor. Since induction motors generally do not run at a speed synchronous with line frequency, it is necessary to increase the input frequency to the motor in order that it be synchronous with, say, the line frequency of the motor.

Figure 1:
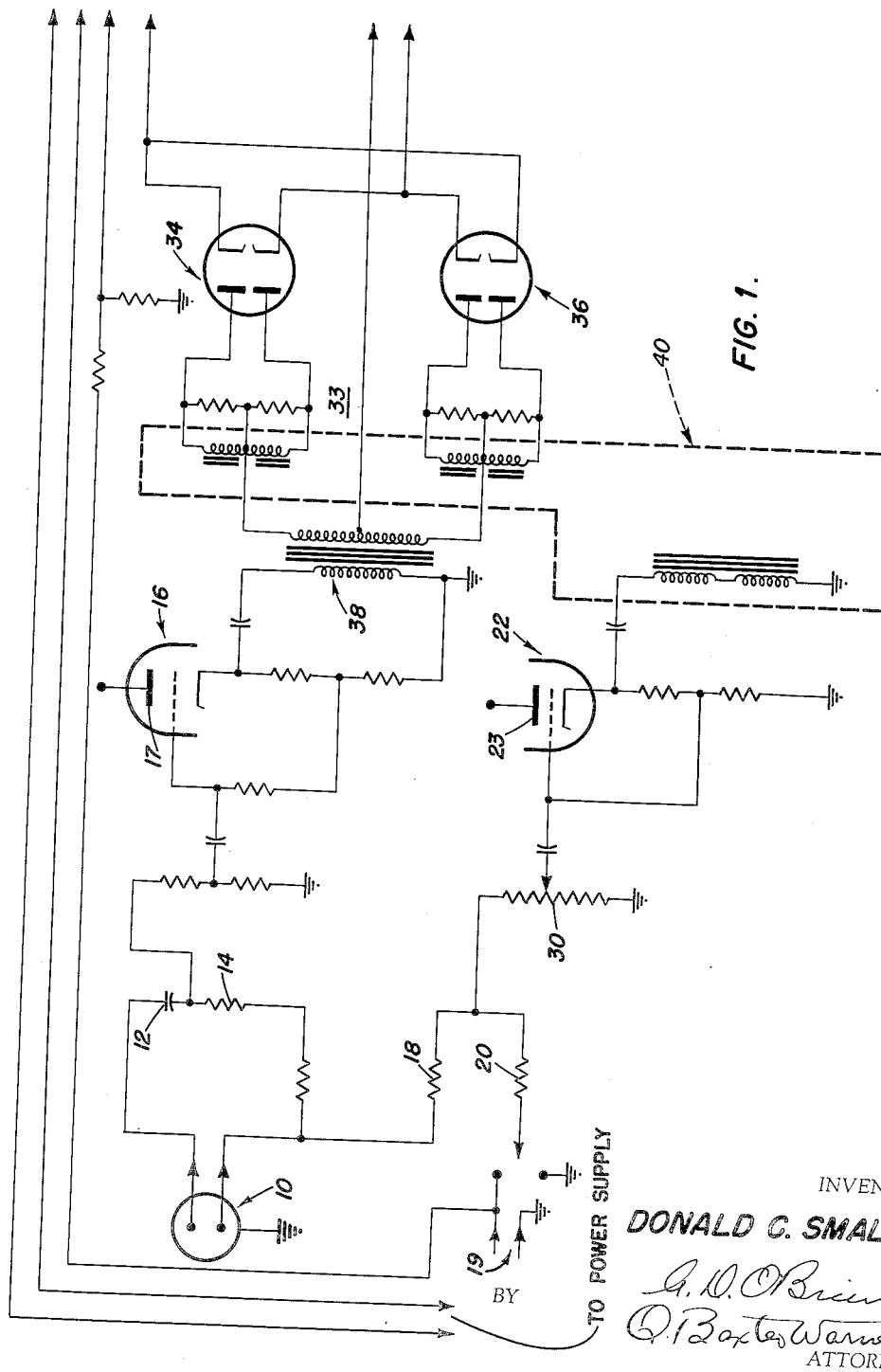
Fig. 1 is a schematic of the circuitry for a frequency discriminator arrangement.
Figure 4:
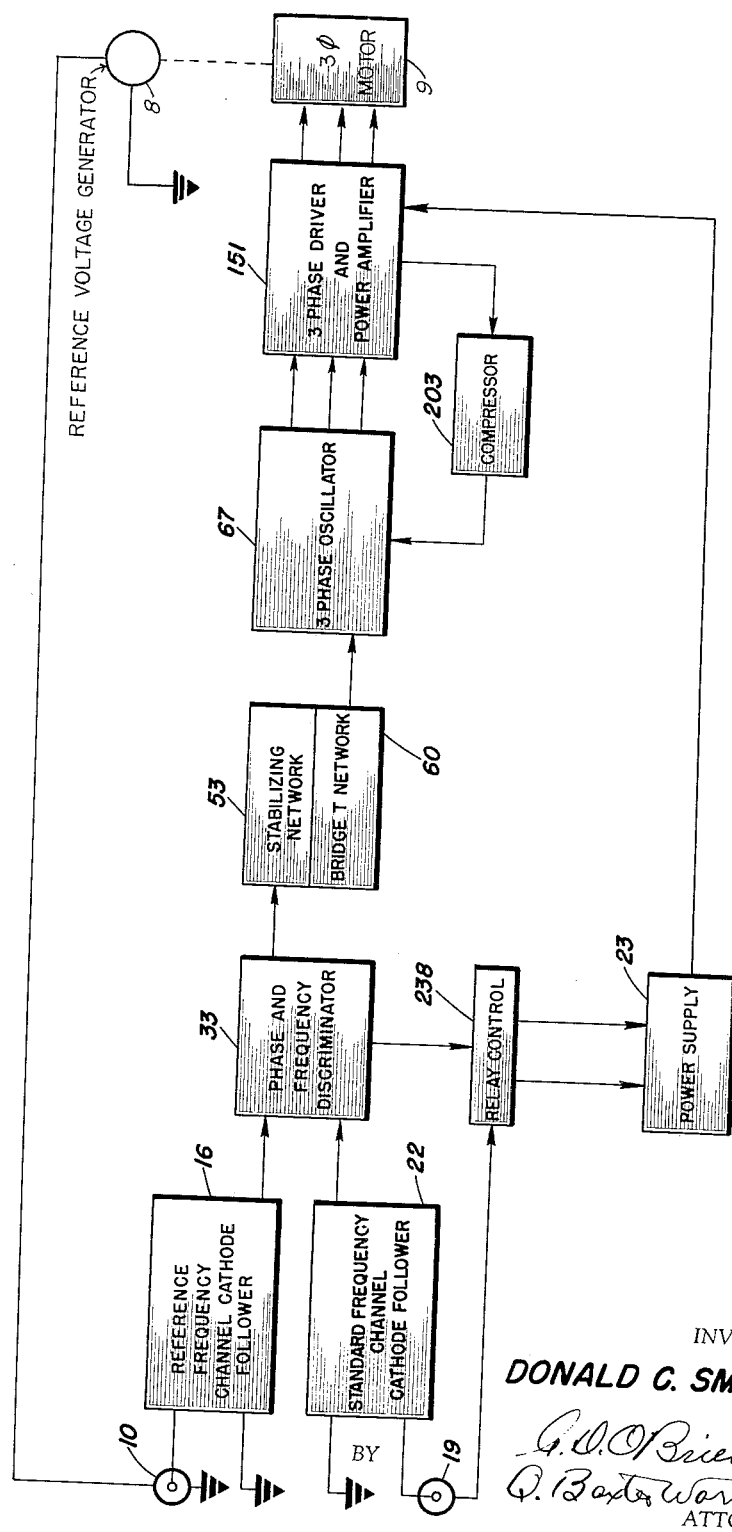
Fig. 4 is a schematic of the over-all system illustrated in Figs. 1, 2, and 3.

Referring now to Figs. 1 and 4 of the drawings, a reference voltage generated by a reference voltage generator 8, which is mechanically connected to a three phase electric motor, such as an antenna nutator motor 9 that is to be controlled, is fed to an azimuth or elevator reference generator transformer 10, then the reference frequency input is taken from either the azimuth or elevation reference generator transformer 10, and then is fed through a phase shifter network comprising a capacitor 12 and a resistor 14, to a cathode follower 16, and through a voltage divider comprising two resistors 18 and 20 to a cathode follower 22. The phase relationship between the two plates 17 and 23 of the cathode followers 16 and 22, respectively, can be adjusted by capacitor 12 and resistor 14. A standard frequency input of thirty (30) cycles from a suitable source 19 is fed through resistor 20, and a gain control resistor 30 into the cathode follower 22.

A phase and frequency discriminator 33, comprising tubes 34 and 36 and transformers 38 and 40, 40, is provided to discriminate in phase and in frequency. These transformers 38 and 40, 40, are driven from the cathode followers 16 and 22. The output of the discriminator is filtered by a network comprising capacitors 44 and 46, and resistors 48, 50, and 52. The voltage output which is obtained is proportional to the phase difference between the reference and standard frequencies. This voltage passes through a stabilizing network 53 including resistors 54, 55, 56, and 57, and capacitors 58 and 59 and into a bridge-T network 60 comprising resistors 61, 62, and 63, and capacitors 64, 65, and 66, which rejects any sixty (60) cycle pickup.

Figure 2:
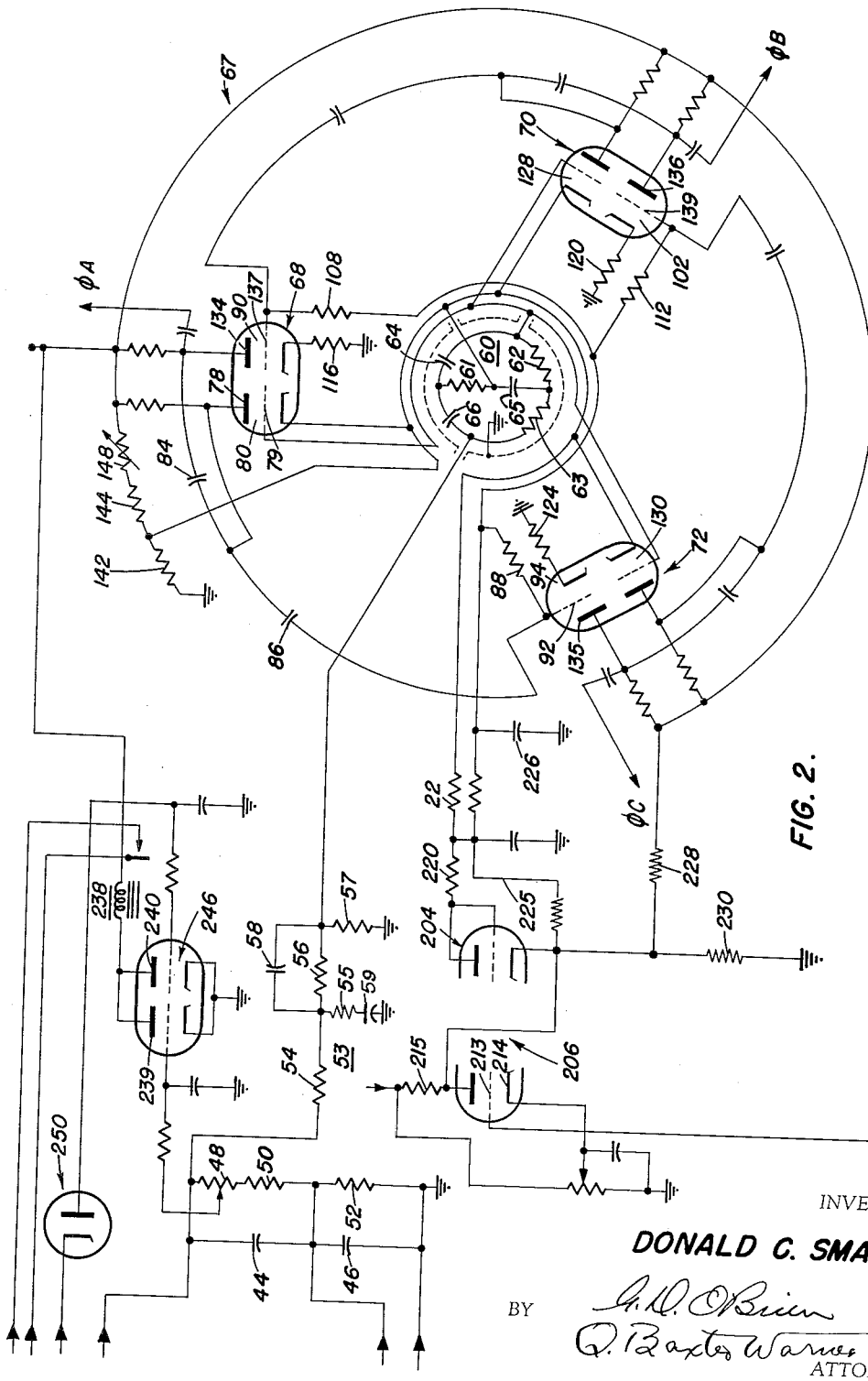
Fig. 2 is a schematic of the circuitry for a 3-phase, R-C, variable voltage, variable frequency oscillator and which is a continuation of the circuitry shown in Fig. 1.

The voltage is then fed to control the frequency of a 3-phase, voltage controlled oscillator shown generally by reference numeral 67, which is illustrated in detail in Fig. 2, and which comprises the invention. The oscillator 67 comprises three single R-C voltage-controlled oscillators 68, 70, and 72, which are connected in the "ring" circuit 67.

Let it be assumed that the "ring" circuit 67 is oscillating and that the phase at the plate 134 of section 90, tube 68, is 0°. A network comprising capacitors 84, 86, a resistor 88, and section 89 of tube 68 produces a 60° phase shift at the grid 92, section 94, tube 72. The 180° phase shift between the plate 135 and grid 92 causes the plate 135, section 94, tube 72, to be 120° (or 240°) out of phase with the reference plate 134, section 90, tube 68.

By the same process the plate 136, section 102, tube 70, is 240° (or 120°) out of phase with the reference plate 134, section 90, tube 68, and a 180° phase shift results between the plate 134 and grid 137, section 90, tube 68. The gain is controlled by the size of grid resistors 108, 88, and 112, and by the feedback action of cathode resistors 116, 120, and 124.

The frequency of oscillation is controlled by the apparent resistance of the sections 80, 130, and 128, of the oscillator tubes 68, 72, and 70, respectively, in the "ring" circuit 67. If the voltage on the grid is changed, the apparent resistance is altered. This, in turn, varies the phase shift between the plates 134, 135, and 136 and the following grids 137, 92, and 139, respectively, of each of the sections 90, 92, and 102, of tubes 68, 72, and 70, and the oscillator 67 changes frequency immediately to keep the phase shift across the network at 60°.

Figure 3:
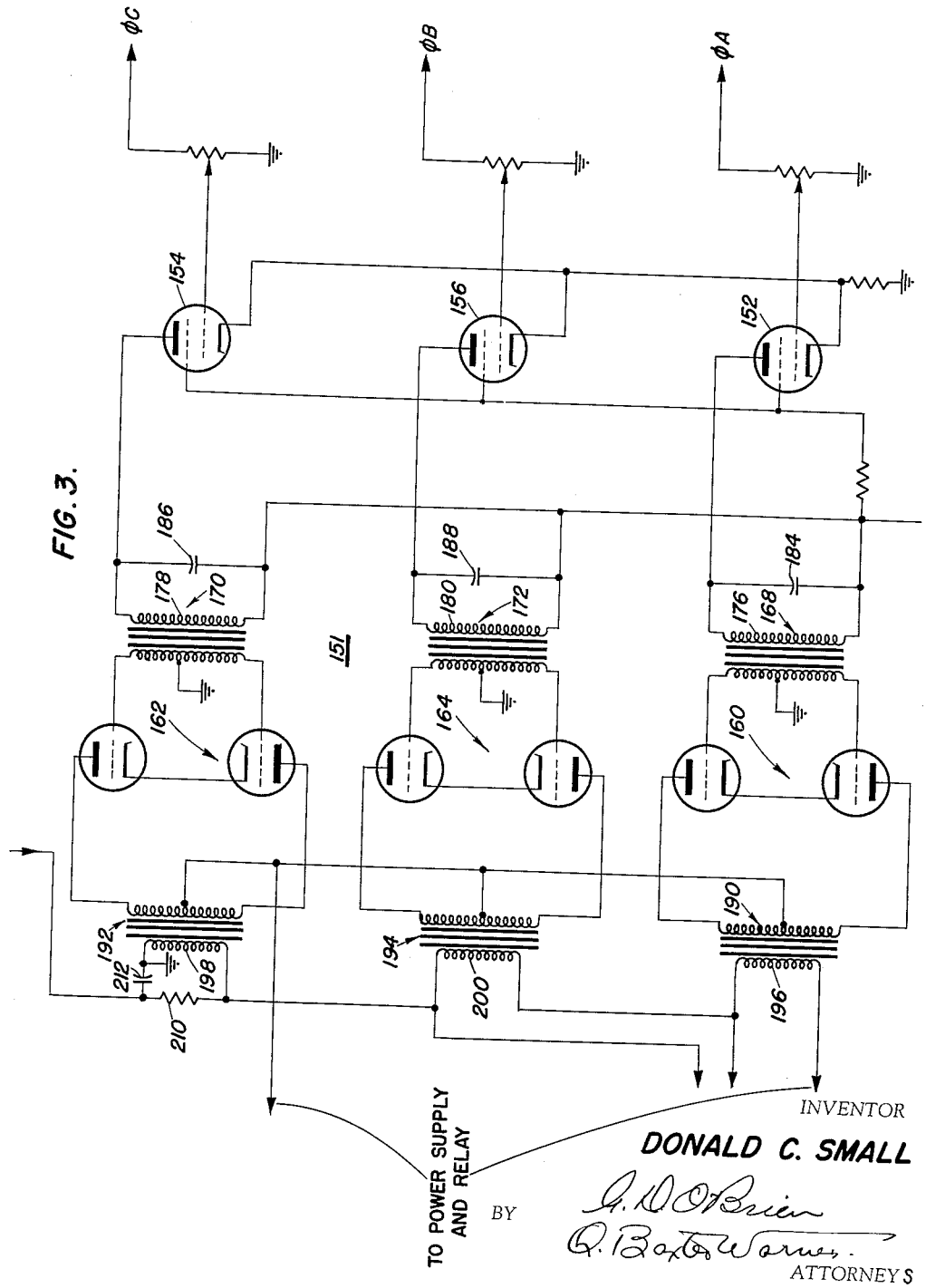
Fig. 3 is a schematic of the power amplifier arrangement and which is a continuation of Figs. 1 and 2.

The quiescent frequency is determined by a bias voltage divider which comprises resistors 142 and 144, and a potentiometer 148. The 3-phase voltages are taken from the plates 134, 135, and 136, sections 90, 94, and 102, of tubes 68, 72, and 70, respectively, and are fed through gain controls to a 3-phase driver and power amplifier 151 including three amplifiers 152, 154, and 156, illustrated in Fig. 3. The outputs of the amplifiers 152, 154, and 156 are coupled to dual push-pull electronic tubes 160, 162, and 164, through transformers 168, 170, and 172, respectively. The primaries 176, 178, and 180, of transformers 168, 170, and 172, are tuned with a .75 μ fd. capacitors 184, 186, and 188 to improve the wave shape and to increase the amplitude of the signal. The tubes 160, 162, and 164 are run at zero bias, and their outputs are applied to step-down transformers 190, 192, and 194, whose secondaries 196, 198, and 200, respectively, are connected in delta when the motor 9 is in operation.

As shown in Fig. 2, a compressor 203 comprising tubes 204 and 206 is provided, the purpose of which will be explained below. The voltage from phase C (phase is hereinafter indicated by the Greek letter φ) of tubes 162 is taken off through a filter comprising a resistor 210 and a capacitor 212, and fed to the grid 213 of compressor tube 206. The cathode 214 of tube 206 is biased sufficiently positive so that only the peaks of the alternating voltage appear across the plate resistor 215.

These peaks pass through the isolation diode tube or compressor tube 204, through a filter network comprising resistors 220 and 222 and capacitors 225 and 226. The resulting direct voltage is used to bias the oscillator grids in sections 90, 94, and 102 of the oscillator tubes 68, 72, and 70. A pair of resistors 228 and 230 provide the normal bias for best operation of the oscillator circuit 64.

A control relay 238 is also provided as shown in Fig. 2. When the control relay 238 is not energized, it closes two other relays in a power supply unit 237, Fig. 4, which makes a motor 9 run from the amplifier output. When the control relay 238 is energized, the motor 9 is run from the line voltage. Another tube 246 is used as a control tube for the control relay 238. The plates 239 and 240 thereof are tied together. One grid is fed with a negative direct current voltage obtained by rectifying the standard signal with crystal diode 250, and the other grid with a direct voltage obtained from the phase detector output. Loss of either of these bias voltages causes tube 246 to draw enough current to energize control relay 238. When the unit is first switched on, the relay is energized until the voltage at the potentiometer resistor 48 is about two volts negative, at which time the oscillator frequency is approximately sixty (60) cycles and the relay 238 is de-energized, switching the motor 9 from the line voltage at the amplifier.

High voltage rectifiers are provided and are connected in delta, and the output therefrom is to give 750 to 800 volts. No filtering is necessary, since 3-phase wave rectification is used. The low voltage supply is standard, providing +300 volts and +255 volts regulated. Power-factor capacitors are provided in conjunction with the output transformers 190, 192, and 194, making the power-factor of the motor 9, as seen from the amplifiers, approximately 100%. Otherwise, the power-factor of the motor 9 alone is approximately 25%. A time delay relay can be provided to allow approximately a one minute delay for a warm-up of rectifier tubes.

To recapitulate, a reference frequency input from either an azimuth or an elevation reference generator transformer 10 is fed through a phase shifter network to a cathode follower 16, and then to a voltage divider. In addition, a standard input frequency of thirty (30) cycles from a suitable source 19, such as a standard generator, is fed into the cathode follower 22. The signals from cathode followers 16 and 22 are then fed to the phase and frequency discriminator 23 which is utilized to discriminate both in phase and in frequency. The output of the discriminator 23 is then filtered by a network, and the output therefrom, which is proportional to the phase difference between the reference and standard frequencies, is then fed through a stabilizing network 53 and into a bridge-T network 60.

The voltage from the bridge-T network 60 is then utilized to control the frequency of the 3-phase oscillator 67. The latter, as previously pointed out, comprises three single, R-C, voltage-controlled oscillators which are connected in a "ring" circuit 67. The 3-phase voltages are taken from the plates of the 3-phase oscillator 67 and are fed through gain controls to a 3-phase driver and power amplifier 151, including the three amplifiers 152, 154, and 156. The outputs of these amplifiers are coupled to the dual push-pull electron tubes 160, 162, and 164, through the transformers 168, 170, and 172. The 3-phase signals from the 3-phase driver and power amplifier 151 are subsequently utilized to control or operate the three phase motor 9 at a fixed speed, thereby providing an electronic control arrangement for a satisfactory "synchronous control" motor.

Obviously many modifications and variations of the present invention are possible in the light of the above teachings. It is therefore to be understood that within the scope of the appended claims the invention may be practiced otherwise than as specifically described.

What is claimed is:

1. A multi-phase, R-C, variable voltage, variable frequency oscillator for use as a control arrangement, comprising, means for generating a reference frequency, means for generating a standard frequency, means for discriminating between said frequencies, means connected to said discriminating means for stabilizing the signal received from said discriminating means, an oscillator means connected to said stabilizing means and including a plurality of dual triodes arranged in a "ring" circuit, said stabilizing means including a bridge-T circuit to attenuate the undesirable voltage frequency appearing between said frequency discriminating means and oscillator means, and means for amplifying the signals received from said oscillator means, thereby providing a constant frequency source which can be used as a control arrangement.

2. A multi-phase, R-C, variable voltage, variable frequency oscillator for use as a control arrangement for an electric motor, comprising, means for generating a reference frequency, means for generating a standard frequency, means for discriminating between the phases of said frequencies, relay control means connected to said phase discriminating means and standard frequency generating means for switching said electric motor from commercial power to said control arrangement and associated circuits, a stabilizing network connected to the output of said phase discriminating means and including a bridge-T circuit for stabilizing the signal from said phase discriminating means, oscillator means connected to the output of said stabilizing means and including a plurality of dual triodes arranged in a "ring" circuit, a like number phase driver and power amplifying means connected to said oscillator means, and means connected to said oscillator means and the phase driver and power amplifying means for compressing the signal from the latter, thereby providing a constant frequency source for use as a control arrangement for said motor.

3. A 3-phase, R-C, variable voltage, variable frequency oscillator for use as a control arrangement for an electric motor, comprising, means for discriminating between reference and standard frequency signals, a 3-phase voltage controlled oscillator means for receiving the signal output from said frequency discriminating means, said 3-phase voltage controlled oscillator means including a plurality of dual triodes arranged in a "ring" circuit, a 3- phase driver and power amplifying means for receiving the signals from said 3-phase voltage controlled oscillator means, and compressor means connected to said 3-phase voltage controlled oscillator means and 3-phase driver and power amplifying means for compressing the signal from the latter, whereby a constant frequency source is obtained for use as a control arrangement for said motor.

4. In combination with an antenna nutator motor, a multi-phase, R-C, variable voltage, variable frequency oscillator for use as a control arrangement for said motor, comprising, means for discriminating between standard and reference frequencies, a stabilizing network including a bridge-T circuit for stabilizing the signal from said discriminating means, a multi-phase voltage controlled oscillator means for providing a controlled constant frequency source from the signal received from said stabilizing network and the bridge-T circuit, and a multi-phase driver and power amplifying means connected to said multi-phase oscillator means for receiving the signals from said multi-phase voltage controlled oscillator, said multi-phase driver and power amplifying means providing multi-phase output signals which can be utilized for controlling said antenna nutator motor.

5. In combination with a motor, a 3-phase, R-C, variable voltage, variable frequency oscillator arrangement for controlling said motor, said arrangement including a frequency discriminating means for discriminating between standard and reference frequencies, a stabilizing network including a bridge-T circuit for receiving the signal from said frequency discriminating means, a 3-phase voltage controlled oscillator means including three dual triodes arranged in a "ring" circuit for receiving the output from said stabilizing network, a 3-phase driver and power amplifying means for receiving the three signals from said 3-phase voltage controlled oscillator means, compressor means connected to said 3-phase oscillator means and said 3-phase driver and power amplifying means for compressing the signal from the latter, whereby the 3-phase signals produced by said 3-phase driver and power amplifying means can be utilized as a constant frequency source to control said motor.

References Cited in the file of this patent
UNITED STATES PATENTS

| | | |
|---|---|---|
| 2,058,114 | Usselman | Oct. 20, 1936 |
| 2,492,184 | Royden | Dec. 27, 1949 |
| 2,540,333 | Hugenholtz | Feb. 6, 1951 |